Aug. 18, 1936.  J. D. MUNTON ET AL  2,051,054
TAP FINDING DEVICE
Filed May 7, 1934
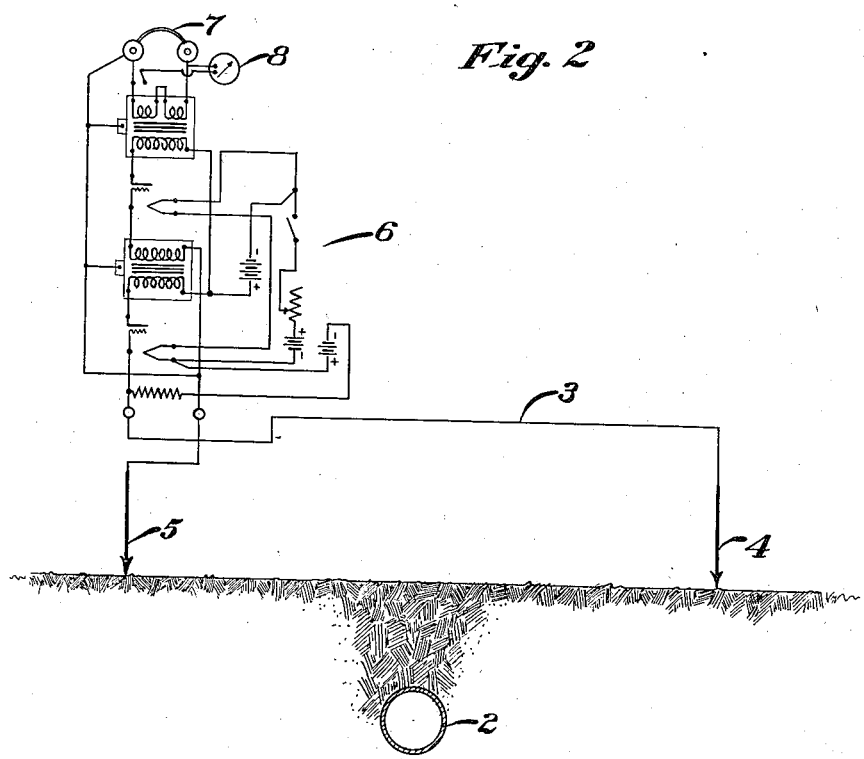
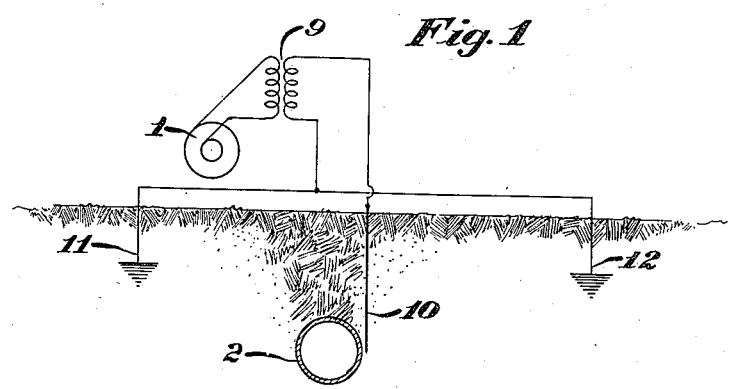
Inventors
John D. Munton
William O. Reeves
By Wallace Ginn
Their Attorney Patented Aug. 18, 1936

2,051,054

UNITED STATES PATENT OFFICE 2,051,054

TAP FINDING DEVICE

John D. Munton, Drexel Hill, Pa., and William O. Reeves, South Westville, N. J., assignors to The Atlantic Refining Company, Philadelphia, Pa., a corporation of Pennsylvania Application May 7, 1934, Serial No. 724,310

11 Claims. (Cl. 175—182)

The present invention relates to a method and apparatus for locating taps from pipe lines or similar conduits. It is especially adapted, for example, in locating taps from an oil pipe line, such as may be surreptitiously installed.

Our apparatus consists of a means for impressing electrical pulsations, for example, alternating current or interrupted direct current of audio-frequency on the main pipe line or conduit, the general location of which is known. The second part of our apparatus consists of means cooperating with, but mechanically disconnected from the first mentioned means, and adapted to be moved along the ground above the pipe line.

Briefly, our method is based upon the principle that a pipe line upon which has been impressed a suitable current, will set up an electrical field about itself. If a bridge or antenna, supported from the ground by capacitance bodies and connected to detecting and amplifying apparatus, is moved along said pipe line and approximately at an angle to the same, the bridge or antenna circuit will be energized by induction set up by the electrical field about the pipe line. By proper positioning of the bridge or antenna, with respect to the source of induced current, i. e., the pipe, it is possible to balance the bridge or antenna circuit so that no current will flow therethrough. However, if a tap be installed upon the pipe line, such tap will effect a concentration of electrical pulsations, or in other words will distort the electrical field in its immediate vicinity. The antenna or bridge, connected to detecting and amplifying apparatus, when brought into the vicinity of the tap, and therefore into the distorted electrical field, cannot be positioned with respect to the pipe line so that the circuit may be balanced and no current will flow therethrough. In such cases, the quantity of current flowing in said circuit may be measured, for example, by a calibrated micro-ammeter. From the magnitude of the current thus detected, the character and location of the field distorting the body, i. e., the tap, may be plotted.

Our method and apparatus will be more clearly understood by reference to the accompanying drawing in which:

Figure 1 is a view taken perpendicular to the earth's surface, showing in cross-section an underground pipe line and means for impressing electrical pulsations thereupon.

Figure 2 is a view taken perpendicular to the earth's surface, showing a second cross-section of the pipe line and apparatus suitable for amplifying and detecting the pulsations from said line.

In accordance with our invention, current, preferably interrupted D. C., is supplied by generator 1 to induction coil 9, wherein an alternating current of audio-frequency is generated. This current is impressed upon the pipe 2 by means of electrode 10 connected to one of the secondary leads of the coil 9. The other secondary lead is grounded by electrode 11 or 12, and preferably by both, in order to obtain a balanced ground. Electrode 10 may or may not be in direct contact with pipe 2, the current being impressed upon said pipe in either case. In this manner, an electrical field is set up about the pipe for an appreciable distance from the source of impressed current.

Referring to Figure 2, at a point along the pipe line, distant from the source of impressed current, a bridge or antenna wire 3 is connected with a suitable amplifying and detecting apparatus 6, including phones 7 and micro-ammeter 8. For practical purposes and as a matter of convenience, the apparatus 6 may be carried by an operator at 5 and the free end of wire 3 by a helper at 4. The helper at 4 is preferably at least partially insulated from the ground and may be totally insulated, while the operator at 5 may or may not be insulated. The workmen constitute capacitance bodies supporting the ends of the wire 3 from the ground. The bridge or wire 3 is carried along the pipe line and, preferably in a position approximately at 90° to said pipe, is adjusted with respect to the pipe so that the circuit is balanced and no flow of induced current through wire 3 may be detected by phones 7 or micro-ammeter 8. When the bridge or wire 3 is not in the vicinity of, for instance, a metal tap leading from the pipe line 2, or other unbalancing conductor, the electrical potential between the two ends of wire 3 may be balanced so that no sound is audible in the phones.

As the wire 3 is carried along the pipe line, the electrical potential may be maintained at balance until said wire is brought into the vicinity of a metal tap or other unbalancing conductor, which acts to distort the electrical field about the pipe line 2. As a result of such distortion, it is impossible to adjust the position of the wire 3 so as to obtain a balance of potential between the ends of said wire and thus eliminate the sound in the phones caused by the amplified induced current flowing in the circuit. In order to measure accurately the current the phones 7 may be disconnected and the micro-ammeter 8 may be connected across the output terminals of the amplifier 6, and the deflection obtained on the meter recorded.

From the magnitude of the deflection on the micro-ammeter and the calibration charts of the apparatus employed, the character of the concealed object may be judged. If the deflection on the meter is relatively small, for example, it will be known that the object which caused the distortion of the electrical field and consequent unbalance of potential was an isolated piece of metal or similar object. However, if the deflection registered is large, i. e., of a certain magnitude, it will be judged that the object causing unbalance of potential is, for example, a metal tap leading from the pipe line. A search is then instigated for the object which is causing distortion of the electrical field.

While it is preferable that the capacitances at 4 and 5 be workmen, we have found that our apparatus is operable if certain other capacitance bodies be substituted in lieu of one or the other of the workmen. For example, we have found that where a body of substantial electrical capacitance which is insulated from the ground is substituted in place of either workmen, our apparatus is operable. However, in such case it becomes necessary to provide additional means for transporting such body along and parallel to the pipe line, which normally renders such substitution undesirable.

In exploring a pipe line of considerable length, it is desirable to have sources of electrical pulsations at intervals along the pipe line, so that no portion of the pipe line being explored will be greater distant from a point at which electrical pulsations are introduced than 1500 feet, or distances of that order. If the ground through which the pipe line passes is moist, or there is conflict with other electrical fields, such as those set up by electric power transmission lines, introduction of electrical pulsations at more frequent intervals may be made; while if the ground is dry and there is no external interference, the distance between such points of introduction may be increased.

While we have described our invention with references to specific apparatus for impressing electrical pulsations upon the pipe line and to amplifying and detecting apparatus cooperating with the aforesaid means, we do not intend to limit ourselves thereto, but contemplate the use of any suitable modification of our current impressing and amplifying-detecting device as being within the spirit and scope of our invention.

We claim:

1. The method of locating taps from a metal conduit concealed in the ground which comprises impressing electrical pulsations on said conduit and passing above said conduit in the direction in which the conduit extends an electrical conductor supported by capacitance bodies from the ground in such relation that normally no current flows through said conductor and detecting any flow of current in said conductor.

2. The method of locating taps from a metal conduit concealed in the ground which comprises impressing electrical pulsations on said conduit and passing above said conduit in the direction in which the conduit extends an electrical conductor supported by capacitance bodies from the ground in such relation that normally no current flows through said conductor and detecting and measuring the magnitude of any current flow in said conductor.

3. The method of locating taps from a metal conduit concealed in the ground which comprises impressing electrical pulsations on said conduit and moving above said conduit in the direction in which the conduit extends an electrical conductor stretched across said conduit and supported at either end by a capacitance body in such relation to the conduit that normally no current passes through the electrical conductor and detecting any flow of current in said conductor.

4. The method of locating taps from a metal conduit concealed in the ground which comprises impressing electrical pulsations on said conduit and moving above said conduit in the direction in which the conduit extends an electrical conductor stretched across said conduit and supported at either end by a capacitance body in such relation to the conduit that normally no current passes through the electrical conductor and detecting and measuring any flow of current in said conductor.

5. The method of locating taps from a metal conduit concealed in the ground which comprises impressing audio-frequency electrical pulsations on said conduit, moving above said conduit in the direction in which the conduit extends an electrical conductor stretched across said conduit and supported at either end by a capacitance body in such relation to the conduit that normally no current flows through said conductor, and detecting any flow of current in said conductor by current-responsive devices giving audible indications.

6. The method of locating taps from a metal conduit concealed in the ground which comprises impressing audio-frequency electrical pulsations on said conduit, moving above said conduit in the direction in which the conduit extends an electrical conductor stretched across said conduit and supported at either end by a capacitance body in such relation to the conduit that normally no current flows through said conductor, detecting any flow of current in said conductor by current-responsive devices giving audible indications, and subsequently measuring the current flow.

7. The method of locating taps from a metal conduit concealed in the ground which comprises impressing audio-frequency electrical pulsations on said conduit, passing above said conduit in the direction in which the conduit extends an electrical conductor stretched across said conduit and supported from the ground at either end by a capacitance body in such relation to the conduit that normally no current flows through said conductor, detecting any flow of current in said conductor by current-responsive means giving audible indications, adjusting the position of said conductor and observing changes in current flow and measuring the magnitude of such current flow.

8. Apparatus for detecting taps to a metal conduit which comprises, means for impressing electrical pulsations on said conduit and cooperating means for exploring the electrical field set up along said metal conduit comprising two masses spaced one from another, each of substantial electrical capacitance, at least one of which is substantially insulated from the earth, a conductor electrically connecting said masses, and means interposed in said conductor for indicating flow of current therethrough.

9. Apparatus for detecting taps to a metal conduit which comprises means for impressing alternating current of an audio-frequency on said conduit and cooperating means for exploring the electrical field set up along said metal conduit comprising two masses spaced one from another, each of substantial electrical capacitance, at least one of which is substantially insulated from the earth, a conductor electrically connecting said masses, means interposed in said conductor for amplifying current which flows therethrough, and means for indicating the magnitude of said current.

10. Apparatus for detecting taps leading from a concealed metal conduit which comprises means for impressing electrical pulsations on said conduit, means for exploring the electrical field set up along said metal conduit comprising a conductor supported from the earth at either end by a capacitance body and means for detecting flow of current in said conductor.

11. Apparatus for detecting taps leading from a concealed metal conduit which comprises means for impressing electrical pulsations on said conduit, means for exploring the electrical field set up along said metal conduit comprising a conductor supported from the earth at either end by a capacitance body, means for detecting flow of current in said conductor and means for measuring the magnitude of such current.

JOHN D. MUNTON.
WILLIAM O. REEVES.